May 28, 1968 SEIICHIRO TSUJII 3,384,926

HIGH-PRESSURE HIGH-TEMPERATURE APPARATUS

Filed Dec. 7, 1966 5 Sheets-Sheet 1

Seiichiro Tsujii
INVENTOR.

by Georges Clujrolle
Attorney

May 28, 1968  SEIICHIRO TSUJII  3,384,926

HIGH-PRESSURE HIGH-TEMPERATURE APPARATUS

Filed Dec. 7, 1966  5 Sheets-Sheet 4

Seiichiro Tsujii
INVENTOR.

by George B. Oujevolk
Attorney

United States Patent Office 3,384,926
Patented May 28, 1968

3,384,926
HIGH-PRESSURE HIGH-TEMPERATURE
APPARATUS
Seiichiro Tsujii, Nerima-ku, Tokyo, Japan, assignor to
Toshiba Tungaloy Co., Ltd., Kawasaki-shi, Japan, a corporation of Japan
Filed Dec. 7, 1966, Ser. No. 599,936
Claims priority, application Japan, Dec. 8, 1965,
40/74,969; July 20, 1966, 41/47,506
9 Claims. (Cl. 18—16)

In high-pressure high-temperature apparatus wherein when main anvils are operated to advance and press an object material to give high power thereon, driven anvils are operated to be urged toward the object material correlatively with the advancing motion of the main anvils by means of a compression means, invention resides in improvements of such compression means which reduce its friction loss caused when driven anvils are advanced and improve the power transmitting efficiency.

This invention relates to high-pressure high-temperature apparatus usable in material transformation or change of the physical properties of solids, and more particularly to a high-pressure high-temperature apparatus for manufacturing synthesized diamond crystals or other high-hard materials.

The high-pressure high-temperature apparatus is used to subject materials to pressures of from about 40,000 to 100,000 atmospheres at a temperature of several thousand degrees centigrade, for example above about 2,000° C. Those conditions are maintained for hours. It has been known that the prior art apparatus disclosed, for example, in the U.S. Patent No. 3,100,912 has a pair of retaining rings respectively having an inner, conically-tapered surface, and six anvils having a conical end respectively, the anvils also respectively resting on and being bore at the inner surface of either of the rings at the end. However, the described apparatus has disadvantages in that the friction loss for sliding ends of the anvils along the inner surface of one of the rings is increased in proportion to the force directly applied to an object material during the press operation of the apparatus, and after the transformation or change of the physical property of the material, it is impossible that the anvils are taken away from the object simultaneously, automatically in relation to backward stroke of the rings because the anvils are not connected with the surface of one of the rings. Therefore, the mechanical efficiency is decreased as compared with the prior art apparatus of the piston type and the rate of operation is also decreased as a result of spending so much time for removing the object material from a cavity formed by the contact surfaces of the anvils by manual operation and for resetting the anvils on the inner surface of the ring.

Accordingly, it is an object of the present invention to provide a high-pressure high-temperature apparatus which has a pair of main anvils movable to compress an object material in a certain direction, a plurality of driven anvils opposite to one another to an object material, and compression couplings for urging the driven anvils to the object material simultaneously automatically in relation to the movement of the main anvils and in the different direction from that of the main anvils, whereby this apparatus is possible to avoid such a friction loss as is generated by sliding anvils on the surface of each of the rings of the prior art apparatus and to easily operate for taking the object material into and from a space surrounded by the contact surface of the anvils.

Preferably, the compression couplings respectively include a pair of compression members and two pairs of circular pillow members respectively located at the ends of the compression member, thereby it being possible that the compression members are rotated about each of the pillow members in order to urge the driven anvils smoothly with a little friction loss.

Each of the compression couplings may include toggle joints which respectively pivot each of the pillow members and are rigidly mounted on platens on which the main anvils are respectively mounted to urge and retract the driven anvils smoothly.

Alternatively, the compression couplings respectively include a pair of compression members which are rotatably mounted on the driven anvils at one end and on each of the platens at each of other ends.

Another object of this invention is to provide a high-pressure high-temperature apparatus which has a pair of main anvils vertically movable, platens upon each of which the main anvils respectively are mounted, at least a pair of driven anvils opposite to one another to the object material, and compression couplings disposed in connection with the platens and each of the driven anvils and pivoted thereon at the ends to urge and retract the driven anvils simultaneously automatically in relation to the movement of the main anvils and in perpendicular direction with the movement of the main anvils.

Preferably, this apparatus includes a bolster ring that forms a plurality of guide bores in respect of the driven anvils in opposition to the object material which is contained in a space surrounded with the contact or urging surfaces of the anvils.

For a more complete understanding of the invention, reference is now made to the following description and to the accompanying drawings, in which.

Figure 1:
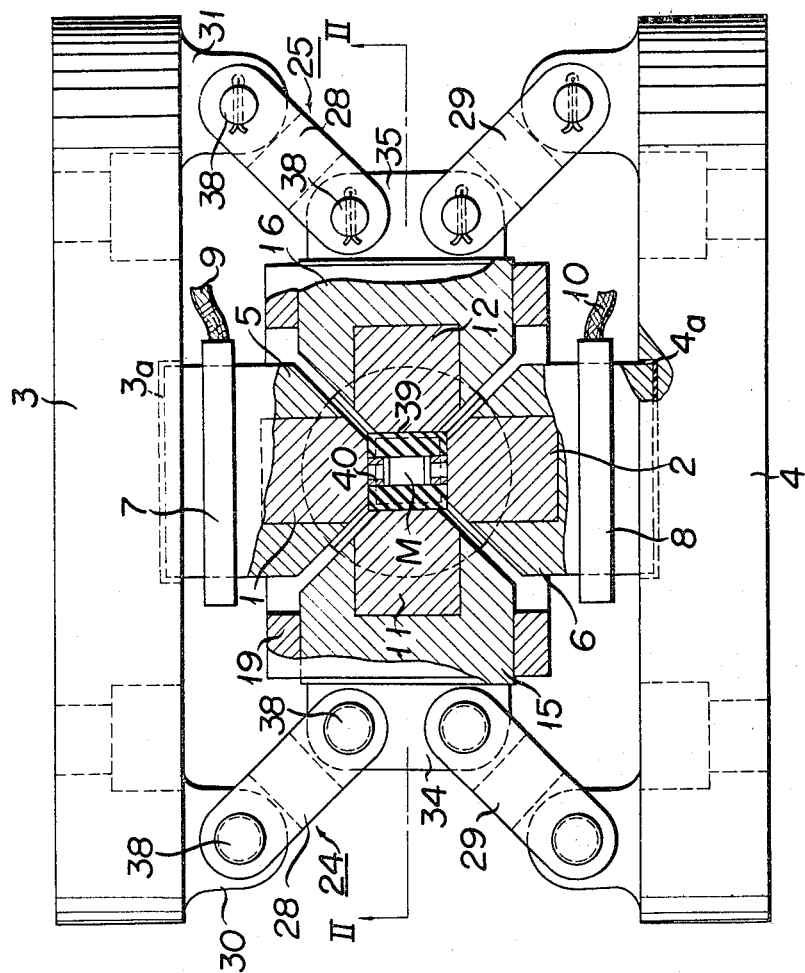
FIG. 1 is a front elevation, partly in section, of a high-pressure high-temperature apparatus embodying this invention.
Figure 2:
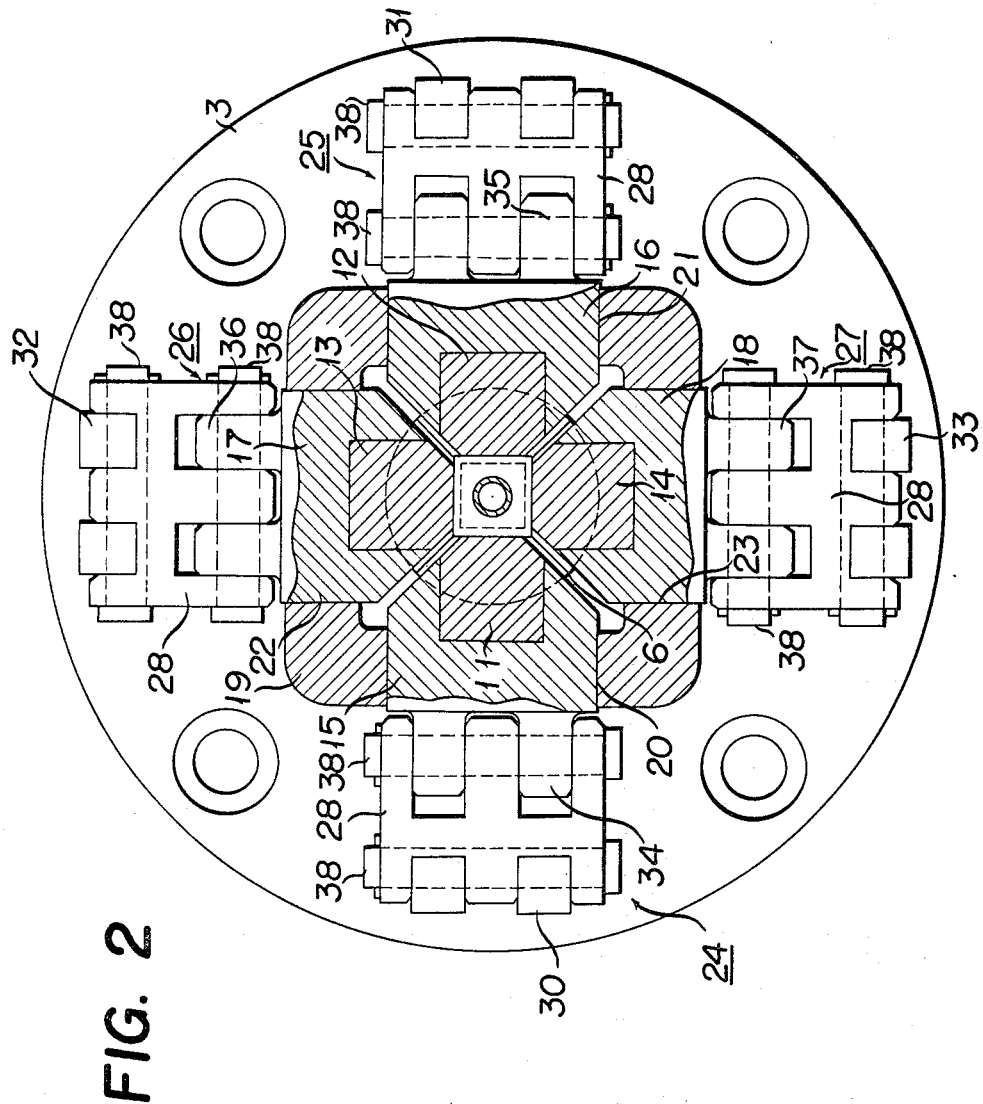
FIG. 2 is a cross section taken along line II—II in FIG. 1.

Referring to FIGS. 1 and 2, two opposing upper and lower main anvils 1, 2 are mounted on platens 3 and 4 of a conventional hydraulic press. As viewed from the figures, the main anvils may be supported or carried by binding blocks 5 and 6 secured in recesses 3a and 4a formed in the platens. Mounted about said binding blocks are conductive rings 7 and 8 which serve to heat an object material through the main anvils and the binding blocks, such as a carbonaceous material, at an elevated temperature, for example, of above 2,000° C., and which are connected through lead wires 9 and 10 to an electric power source not shown.

The main anvils 1 and 2 supported by the binding blocks 5 and 6 are correlatively vertically movable according to the movement of the platens and have tapered portions. In the illustrated embodiment, each of the main anvils has a pyramid portion and a flat contact face which, in its working position, contacts with the object material to transmit power thereto.

By the expression "object material" or the like used herein is intended to mean a combination of a starting material, for example, for diamond formation, such as a carbonaceous material, and a vessel containing such starting material.

At least one pair of driven anvils 11 and 12 are disposed in a direction perpendicular to the axis of the main anvils, so that they may be aligned in a horizontally opposing relationship. In the embodiment shown, a further pair of driven anvils 13 and 14 are provided in a similar manner to oppose each other in a direction perpendicular to that of alignment of the driven anvils 11 and 12. Those driven anvils 11, 12, 13 and 14 may be supported or carried by binding blocks 15, 16, 17 and 18 as the main anvils and have flat contact faces of substantially the same shape as that of the main anvils. The contact faces of the main and driven anvils will thus form a cavity in which the object material is placed and subjected to a high pressure and a high temperature.

Between the opposing platens 3, 4 is further provided a guide ring 19 whose axis is aligned with that of the main anvils and which has four resting bores 20, 21, 22 and 23 perforated in an equally spaced relationship in the circumference thereof to permit the driven anvils to reciprocate therethrough. The number of such resting bores is of course identical with that of driven anvils employed.

The driven anvils are secured on lugs 34, 35, 36 and 37 and movably connected to the platens 3, 4 by means of compression couplings 24, 25, 26, and 27 each of which includes a pair of compression members 28 and 29. As best shown in FIG. 1, the compression members 28 are pivotally connected, by means of pins 38, to the lugs 34, 35, 36, and 37 at one ends thereof and to lugs 30, 31, 32 and 33 at the other ends, said lugs 30, 31, 32 and 33 being mounted on the upper platen 3. Similarly, the compression members 29 are pivotally connected to the lower portions of the respective lugs 34, 35, 36 and 37 at one ends thereof, and at the other to respective lugs provided on the lower platen 4. Thus, when, in operation, the platens are correlatively urged in an accessible direction toward the object material by pistons of a hydraulic press, the compression members cause the driven anvils to be urged toward the object material through the respective bores formed in the guide ring.

A lower platen may be fixed on a foundation, while an upper platen may be urged only in an accessible direction toward the object material located on a contact face of the main anvil of the lower side platen.

The vessel, for example, comprises a cylinder 39 of wonderstone, molybdenum discs for sealing the cylinder at its ends, and steel rings 40 inserted securely in the open ends of the cylinder to secure the discs in position and to pass an electric current from the main anvils to the starting material.

The cylinder 39 may take any cubic configuration and an insulator made of ceramics or pyrophillite may be filled in each of the steel rings 40.

The object material is tightly placed in the cavity formed by the contact faces of the anvils when the latter are urged by the platens driven by piston assemblies not shown.

For applying high-pressure to the object material such as a carbonaceous material, the platens are further driven and then the main anvils and the driven anvils transmitted power by the compression couplings are urged into the space according to the increase of powers applied by advancing of the pistons.

Additionally, the material in the cylinder generates Joule heat by applying an electric current through the steel rings 40 and the main anvils 1 and 2 from the conductive rings 7 and 8, thus conditions of the high-pressure and high-temperature are simultaneously maintained for hours. As a resut, the physical property of the solid, of the object material is transformed or changed, for example the carbonaceous material is charged into synthesized diamond crystal.

In this operating case, the driven anvils will be correctly advanced as the resting bores carry and guide the driven anvils.

In returning operation, the platens are taken away from one another, and the main anvils are accompanied with the platens. The driven anvils are also withdrawn from the object material by the compression couplings which move in relation to the movement of the platens and are rested in the bores of the guide ring, and thus the object material tranforming or changing the physical property is removed therefrom.

In this embodiment, the compression members, lugs and pins should be strongly made to withstand transmitting great powers.

Figure 3:
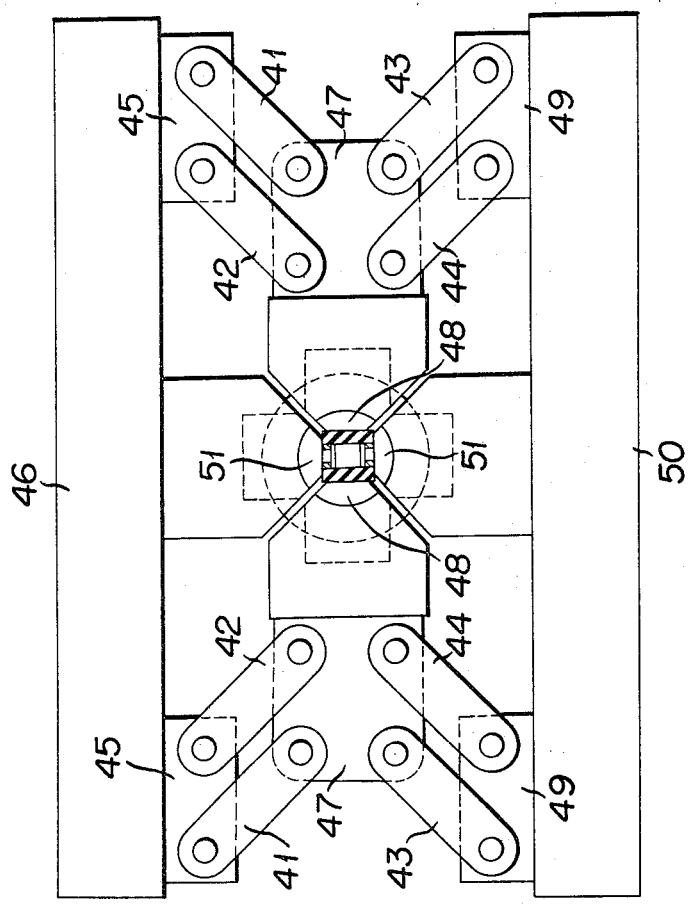
FIG. 3 is a front elevation illustrating a modification of the apparatus shown in FIG. 1.

Referred to FIG. 3 is a modification of the high-pressure high-temperature apparatus of this invention. The guide ring as above is omitted from the apparatus shown in FIG. 3, but the compression couplings are respectively constructed in dual type, i.e. each of the compression couplings has at least two pairs of members 41, 42, 43 and 44, said members 41 and 42 being aligned parallel to one another and being rotatably connected to one of lugs 45 on an upper platen 46 and to one of lugs 47 of each of driven anvils 48 at each ends, said members 43 and 44 being similarly aligned parallel and being rotatably connected to one of lugs 49 on a lower platen 50 and to one of lugs 47 at each end. The length of each of the members between its pivoted points should be decided on the same length. Therefore, advancing and withdrawing of the driven anvils maintain in a horizontal alignment, so that the main anvils 51 and the driven anvils 48 are capable of constituting a space closed tightly for an object material, and if possible, together gaskets held between inclined surfaces of the tops of the anvils.

Figure 4:
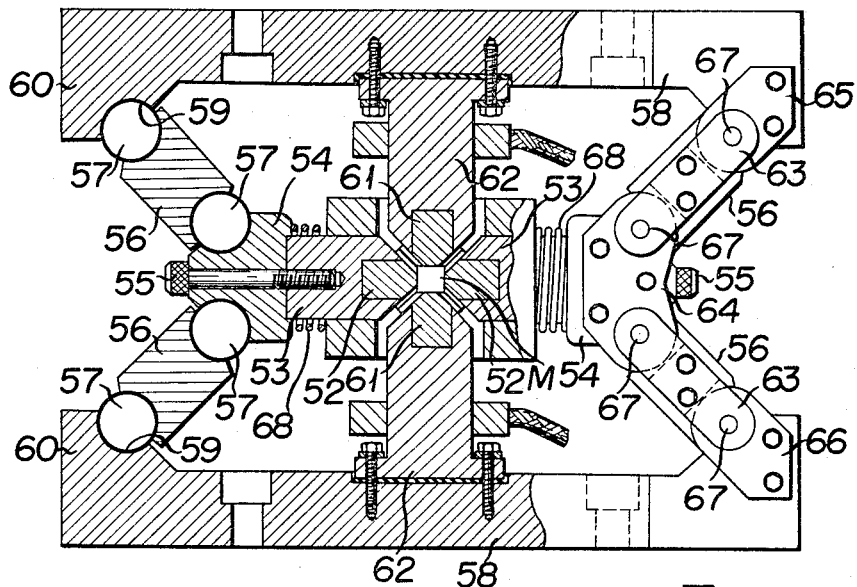
FIG. 4 is a front elevation, partly in section, of a further modification of the apparatus of this invention.
Figure 6:
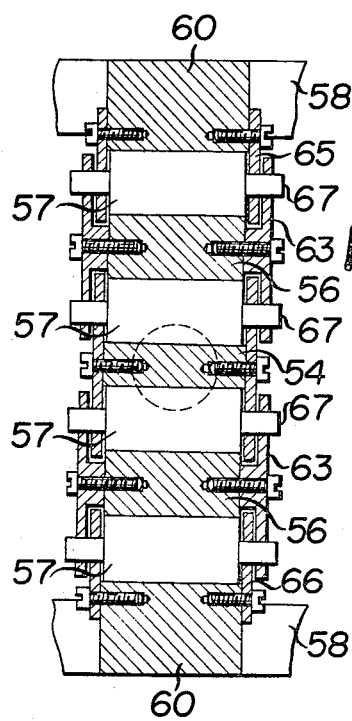
FIG. 6 is a cross section taken along line V—V in FIG. 5.
Figure 5:
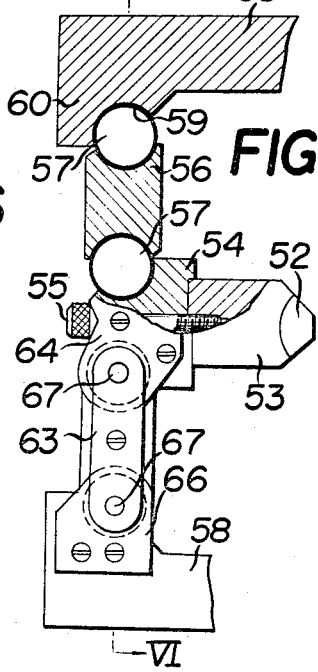
FIG. 5 is an elevation, partly in section, of a driven anvil and the associated mechanism in retracted or non-working positions in accordance with this invention.

In FIGS. 4, 5 and 6, a further modification of this high-pressure high-temperature apparatus is shown. The apparatus has driven anvil assemblies and compression couplings different from those of the apparatus already described and indicated in FIGS. 1 and 2, the driven anvil assemblies respectively including a driven anvil 52 formed with a contact surface at top end, a binding block 53 for reinforcing the driven anvil which is secured in the block, and a pad carriage 54 on which the binding block is mounted and connected by a check bolt 55, said carriage having concave surfaces at an upper corner and a lower corner of the back end respectively to receive a pillow member described hereinafter.

The compression couplings includes a pair of compression members 56 forming concave surfaces at its both ends, two pairs of cylindrical pillow members 57, and toggle joints for connection of the driven anvils 52 and upper and lower platens 58, the platens forming concave surfaces 59 in its side projecting portions 60, each of the pillow members being borne on each of the concave surfaces of the compression members while being borne on one of the concave surfaces of the pad carriages or of the platens. Therefore, high-pressure applied to the platens by driving the pistons of a hydraulic piston assembly is transmitted through the pillow members and the compression members to the driven anvils, and thus main anvils 61 in binding blocks 62 mounted on the platens and the driven anvils advance toward the center of a guide ring in association with access of the platens, so that the object material M filled in a cylinder made of wonderstone is contained in a space which is constituted with contact surface of the top ends of all anvils. In this case, the guide ring has resting bores to guide correctly and rest the driven anvils like those of the embodiment shown in FIGS. 1 and 2.

The operation for urging and retracting the anvils and for maintaining the material in conditions of the high-pressure and high-temperature during change of the physical property of the solid is substantially practised in the manner described in connection with the foregoing apparatus.

However, in this embodiment, toggle joints are provided only to be used for retracting the driven anvils, i.e. the toggle joints respectively have a pair of links 63 attached on side of the compression members respectively, brackets 64, 65 and 66 each of which is mounted on side of the pad carriage and projecting portions of the platens, and pins 67 pivoted on the links and the brackets at an axis coaxially aligned with that of the pillow members. Moreover, compression springs 68 respectively positioned between the guide ring and each of the pad carriage and wound around each of the driven anvils. Therefore, when the anvils are advanced, compression members are respectively revolved around the pillow member slidably and transmit simultaneously compressing powers to the driven anvil, when retracting the anvils, by the spring action of the compression springs, the driven anvils are taken away from the cylinder containing the object material in accordance with the withdrawal of the platens driven by the pistons. Such compression couplings are operated only with the compressing stress against the compression members and the pillow members different from those of the embodiment in FIGS. 1 and 2 or in FIG. 3, so that the compression couplings are possible to transmit greater power to the driven anvils as compared with those of prior embodiments, in this connection the compression couplings shown in FIGS. 1 to 3 are operated only with the shearing stress against each of pins, so that diameter of the pins must be determined as great as possible in order to bear the supplied powers and the compression members and the lugs should also be determined to have ample dimension.

Figure 7:
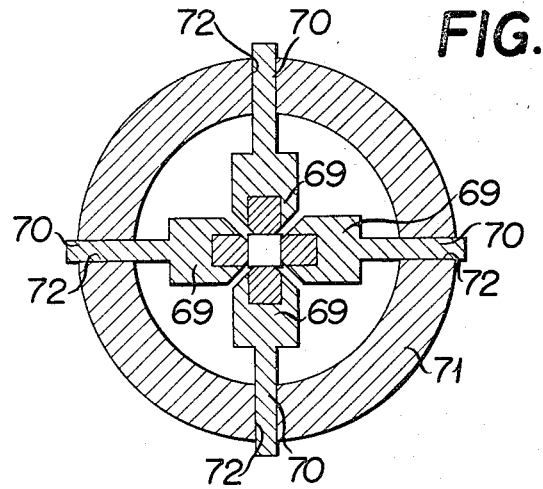
FIG. 7 is a cross sectional plan illustrating a modification of a guiding and resting member such as a ring.
Figure 8:
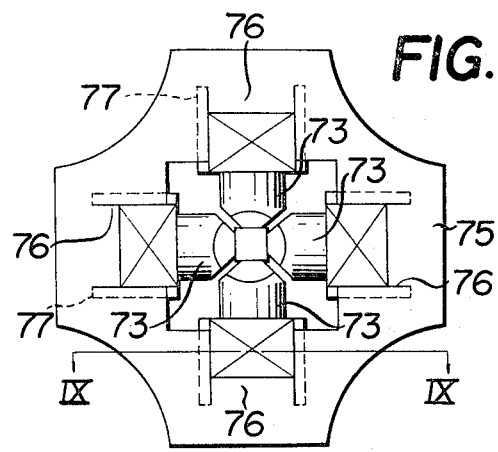
FIG. 8 is a plan illustrating a further modification of the guiding and resting member.
Figure 9:
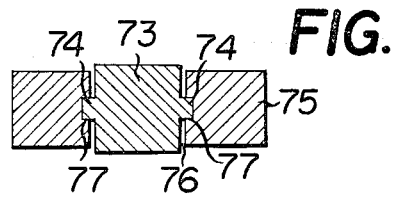
FIG. 9 is a cross section taken along line IX—IX in FIG. 8.

FIG. 7 and FIGS. 8 and 9 respectively show further modifications of the guiding and resting ring according to this invention.

Driven anvils 69 shown in FIG. 7 have guide rods 70 at the rear portions, and a guiding and resting ring 71 having resting bores 72 formed therein to receive the guide rods 70 of the driven anvils is located outside the compression means (omitted from the figure).

Each of the driven anvils shown in FIGS. 8 and 9 comprises a pair of projections 74 as shown in FIG. 9 which at the rear portion extend in the direction of movement of the anvil at the opposite sides thereof, and a guiding and resting ring 75 located outside the compression means (omitted from the figures) is provided with guide recesses 76 each having grooves 77 formed in the opposing surfaces thereof and which extend in the direction of movement of each driven anvils so that the projections of each of the driven anvils may be slidably fitted in the opposing grooves 77 of each recess.

The guiding and resting ring in the foregoing embodiments may of course take forms other than a ring.

While the invention has been described in connection with several preferred examples, it will be obvious to those skilled in the art that the invention is not limited to the preceding examples but various changes and modifications can be made in the details of the method and structure without departing from the true spirit and scope of the invention.

What is claimed is:

1. A high-pressure high-temperature apparatus comprising a pair of opposing platens driven by a piston means, a pair of main anvils having opposing tapered portions including contact faces and rear portions connected to said platens, a plurality of driven anvils having tapered portions including contact faces and which are disposed on the same plane and movable in a direction perpendicular to the axis of said main anvils, compression means which advance said driven anvils forward in proportion to the movement of the platens whereby a cavity is formed by the contact faces of said main and driven anvils to place therein an object material to be subjected to a high pressure and a high temperature, and means to heat the object material to a high temperature, characterized in that each of said compression means comprises a pair of compression coupling means, one of which is revolvingly connected to one of said platens at one end and to one of said driven anvils at the other, and the other of which is revolvingly connected to the other of said platens at one end and to said one of said driven anvils at the other.

2. A high-pressure high-temperature apparatus as claimed in claim 1 characterized in that the compression couplings respectively include a pair of compression members each of which is pivotally mounted on one of the platens and one of the driven anvils.

3. A high-pressure high-temperature apparatus claimed in claim 1 characterized in that the compression couplings respectively include a pair of compression members each of which is borne through each of cylindrical pillow members at both ends onto the platen and the driven anvil.

4. A high-pressure high-temperature apparatus as claimed in claim 1 characterized in that the compression couplings respectively include a pair of compression members each of which forms concave surfaces at both ends, and cylindrical pillow members respectively bearing the compression member at the concave surfaces, and the platens and the driven anvils respectively form concave surfaces according to the pillow members for bearing the latter, so that the driven anvils simultaneously urge to the object material in relation to the movement of the main anvils.

5. A high-pressure high-temperature apparatus as claimed in claim 1 characterized in that a guide ring is provided, said guide ring having a plurality of guiding and resting bores in respect of the driven anvils to guide correctly and rest the latter to the object material.

6. A high-pressure high-temperature apparatus as claimed in claim 1 characterized in that the main anvils are vertically moved toward the object material, and the driven anvils are moved in perpendicular direction with that of the main anvils simultaneously by advancing and retracting movement of the platens to the object material.

7. A high-pressure high-temperature apparatus as claimed in claim 3 characterized in that toggle joints in respect of the compression couplings are provided, said toggle joints respectively having a pair of links each of which is attached on side of the driven anvil, and brackets respectively mounted on side of the driven anvil and the projecting portion on the platen, said links being respectively pivoted on said brackets at its ends by pins which are respectively aligned in coaxial axis of the pillow member.

8. A high-pressure high-temperature apparatus as claimed in claim 1 characterized in that a pair of the driven anvils are horizontally movable and in perpendicular direction with the movement of the main anvils vertically movable, and a pair of other driven anvils are disposed in the same horizontal plane with that of the former driven anvils and in perpendicular direction with that of the movement of the former.

9. A high-pressure high-temperature apparatus as claimed in claim 1 characterized in that binding blocks are provided for securing each of the anvils in each thereof.

References Cited

UNITED STATES PATENTS

| 1,881,232 | 10/1932 | Kurath. | |
| 1,960,501 | 5/1934 | Maul | 100—232 XR |
| 2,867,002 | 1/1959 | Zalozecky | 180—232 XR |
| 2,885,731 | 5/1959 | Fraula et al. | 100—232 XR |
| 2,907,068 | 10/1959 | Vdolek. | |
| 2,986,837 | 1/1961 | Zeitlin. | |
| 3,000,429 | 9/1961 | Warenken | 18—167 XR |

FOREIGN PATENTS 509,186  11/1920  France.

WILLIAM J. STEPHENSON, *Primary Examiner.*